US011958691B2

(12) United States Patent
Teoli

(10) Patent No.: US 11,958,691 B2
(45) Date of Patent: Apr. 16, 2024

(54) ROOFTOP DELIVERY RECEPTACLE FOR UNMANNED AERIAL VEHICLES

(71) Applicant: David John Teoli, Willowbrook, IL (US)

(72) Inventor: David John Teoli, Willowbrook, IL (US)

( * ) Notice: Subject to any disclaimer, the term of this patent is extended or adjusted under 35 U.S.C. 154(b) by 123 days.

(21) Appl. No.: 17/739,067

(22) Filed: May 6, 2022

(65) Prior Publication Data

US 2022/0356019 A1    Nov. 10, 2022

Related U.S. Application Data

(60) Provisional application No. 63/185,292, filed on May 6, 2021.

(51) Int. Cl.
| | | |
|---|---|---|
| *B65G 11/12* | (2006.01) | |
| *A47G 29/14* | (2006.01) | |
| *B64U 101/64* | (2023.01) | |

(52) U.S. Cl.
CPC .......... *B65G 11/123* (2013.01); *A47G 29/141* (2013.01); *B64U 2101/64* (2023.01); *B65G 2201/0285* (2013.01); *B65G 2814/0398* (2013.01)

(58) Field of Classification Search
CPC .............. B65G 11/123; B65G 11/20; B65G 2201/0285; B65G 2814/0398; A47G 29/20; A47G 29/22; A47G 29/141; A47G 2029/149; B64C 39/024; B64D 1/02; B64F 1/32; B64U 2101/64; G06Q 10/0832; G06Q 50/28
See application file for complete search history.

(56) References Cited

U.S. PATENT DOCUMENTS

| | | | | |
|---|---|---|---|---|
| 10,147,067 B2 * | 12/2018 | Pleis | ................ | A47G 29/1225 |
| 10,210,475 B2 * | 2/2019 | Pargoe | .............. | G06Q 10/0836 |
| 10,351,261 B1 * | 7/2019 | Bryant | ...................... | B64F 1/32 |
| 10,501,205 B1 * | 12/2019 | Siewert | .................. | A47G 29/22 |
| 10,946,982 B2 * | 3/2021 | Carthew | .................. | B64F 1/32 |
| 10,993,569 B2 * | 5/2021 | Gil | ........................ | A47G 29/30 |
| 11,066,186 B2 * | 7/2021 | Walsh | ..................... | B60L 53/12 |

(Continued)

FOREIGN PATENT DOCUMENTS

GB      2601010 A  *  5/2022   .............. B60L 53/30

*Primary Examiner* — William L Miller

(57) ABSTRACT

A rooftop package delivery receptacle for unmanned aerial vehicles (UAV) is transformed from a normally closed downwardly pitched transparent or translucent aesthetically acceptable rooftop aperture, appearing as an ordinary skylight, into a preferably larger substantially horizontal delivery platform providing a safe, secure, above ground location for a drone to land or tether for package delivery. Upon a wireless command signal from either an arriving UAV or a local user, the curb frame mounted receptacle containing a center pivoting platform supporting a plurality of slidably mounted panels rotates upwards and expands both longitudinally and transversely enabling a larger substantially horizontal landing area. After the package is delivered the platform contracts to its original size and continues in an upwards rotation urging the package to move inwards for collection. A pair of weatherproof accordion shaped shudders surround the openings and enclose any gaps during the operation.

17 Claims, 16 Drawing Sheets

(56) References Cited

U.S. PATENT DOCUMENTS

| | | | |
|---|---|---|---|
| 11,379,784 B1* | 7/2022 | Eastman | B64C 39/024 |
| 11,556,887 B2* | 1/2023 | Pargoe | B64C 39/024 |
| 11,667,483 B2* | 6/2023 | Mercado | B66B 1/3446 |
| | | | 414/217 |
| 2015/0158599 A1* | 6/2015 | Sisko | B64F 1/20 |
| | | | 244/114 R |
| 2015/0175276 A1* | 6/2015 | Koster | B64F 1/00 |
| | | | 244/114 R |
| 2015/0183528 A1* | 7/2015 | Walsh | B64F 1/04 |
| | | | 244/114 R |
| 2017/0116568 A1* | 4/2017 | Pleis | A47G 29/14 |
| 2018/0105289 A1* | 4/2018 | Walsh | E06B 7/32 |
| 2018/0225628 A1* | 8/2018 | Roy | B64C 39/024 |
| 2018/0290764 A1* | 10/2018 | McMillian | G08G 5/0026 |
| 2020/0180880 A1* | 6/2020 | Gil | A47G 29/30 |
| 2020/0198801 A1* | 6/2020 | Carthew | B64F 1/00 |
| 2020/0231393 A1* | 7/2020 | Mercado | G06Q 10/083 |
| 2021/0394930 A1* | 12/2021 | O'Toole | A61L 12/00 |
| 2022/0055770 A1* | 2/2022 | O'Toole | B64U 50/19 |
| 2022/0388682 A1* | 12/2022 | Hurst | B64F 1/222 |
| 2023/0100169 A1* | 3/2023 | Laczak | G07F 5/26 |
| | | | 232/1 R |
| 2023/0112944 A1* | 4/2023 | Pargoe | H04W 4/021 |
| | | | 232/38 |

* cited by examiner

ROOFTOP DELIVERY RECEPTACLE FOR UNMANNED AERIAL VEHICLES

This application claims the benefit of U.S. Provisional Application No. 63/185,292, filed May 6, 2021, which is hereby incorporated by reference, to the extent that it is not conflicting with the present application.

BACKGROUND

The on-line shopping industry has created a huge market for the delivery of packages directly to the consumer's residence. As the demand increases, the competition for faster services also increases including even same-day just-in-time delivery. In keeping up with demand, today's supply chain industry has increased local neighborhood street traffic beyond desired safety levels. A relatively new technology gaining regulatory acceptance is in the use of unmanned aerial vehicles (UAV) or drone to complete the last mile delivery for at least smaller packages (5 lbs or less). The realization of this technology for residential delivery does not come without its own challenges including how and where to deliver the package. Some of the drone delivery solutions presented in the prior art arrive at the address location and land on the ground at a designated area, other drones hover over and lower a tether; both automatically releasing the package without the need for assistance. Some of the patented delivery receptacle solutions in the prior art include free standing receptacles resembling mailboxes, others are located on attachments to the sides of buildings or are added structures to the rooftops of buildings. In addressing solutions to this challenge, the prior art has established the need for safety in avoiding potential environmental hazards at ground level such as vegetation, pets, or pedestrian traffic, decreasing possible theft by providing secure receptacles, and complying with local appearance standards by introducing solutions that are aesthetically acceptable. The objective of this invention is to provide a solution upon which a traditional rooftop apparatus is transformed into a safe, secure delivery platform without the need to create new rooftop apertures or add new structures while minimizing any potential conflict with existing residential appearance standards.

BRIEF SUMMARY OF THE INVENTION

The present invention discloses a rooftop package delivery receptacle for unmanned aerial vehicles (UAV) that in one aspect appears as a skylight. The invention primarily resides in the transformation of a normally closed downwardly pitched transparent or translucent aesthetically acceptable rooftop aperture into a preferably larger substantially horizontally disposed delivery receptacle providing a safe, secure, above ground location for a drone to land or tether for package delivery. Ideally, the receptacle can be installed in a single pre-cut opening of a pitched roof of a residential building according to local building codes as either a replacement or new installation. Preferably, a rooftop location for drone delivery solves many of the concerns discussed in the prior art and by providing a solution that can make use of an already existing roof hole, allows an alternative without the need to create a new one. The receptacles preferred embodiment primarily makes use of a curb frame with a pivotably mounted platform supporting a plurality of slidably mounted panels wherein, for delivery, the platform rotates upwards becoming substantially horizontal and the panels expand both longitudinally and transversely creating a larger area than the original size of the platform. After the package is delivered, the platform contracts to its original size and continues to rotate upwards urging the package to move inwards for collection while simultaneously keeping any gaps in the aperture substantially closed to the outside elements using expandible and contractible gusset shaped shudders. The delivery receptacle can be made from various materials including but not limited to, stainless steel, aluminum, carbon fiber, rubber, various plastics, plexiglass, polycarbonate, acrylic, and the like. The manufacturing industry is replete with commercially available technology that can be incorporated into the manufacturing design including but not limited to linear actuators, sliding mini rails, miniature rollers, servo motors, microcontrollers, and the like.

One aspect of the embodiment which is not illustrated may include both the platform and panels being further sub divided into a plurality of smaller transparent or translucent sections disposed within a structural grid wherein the grid members being disposed both longitudinally and transversely help to mask the existence of any linear actuator or mini rail members. Another aspect of the embodiment which is not illustrated may include the use of rubber gaskets along the edges of the frame, platform, and panel members to further create a waterproof seal. Ideally, the operation of the delivery receptacle would include a controlling mechanism coordinating the various stages of movement. Access to the controller may include but not be limited to Wi-Fi, Bluetooth, Infrared remote, smartphone applications, an internet-based drone delivery service subscription, or mounted panel on the receptacle itself. Another aspect of the embodiment which is not illustrated may include a built-in sensor to detect humidity in case of inclement weather and include a means to position the platform slightly downwards creating a 2% slope thereby allowing any potential rainwater to runoff the end or incorporate a small trough and micropump system disposed substantially along the inside edge of the platform providing means to clear any rainwater buildup. Another aspect of the embodiment which is not illustrated may include a means to lock the rotation of the platform after reaching its desired position using a plurality of pins disposed within a hinge joint mechanism that would protrude outwards and engage the frame members by an electro-mechanical means keeping the platform stationary in case of power failure. Another aspect of the embodiment which is not illustrated may include a means to retract the panels and reset the platform back to a closed position in case of power failure. Another aspect of the embodiment which is not illustrated may include a solar panel or one that appears as such to be installed alone or alongside an array of existing solar panels maintaining the objective of minimizing any conflict with existing residential appearance standards.

BRIEF DESCRIPTION OF THE DRAWINGS

The accompanying drawings, which are incorporated into and form a part of the specification, schematically illustrate one or more exemplary aspects of the embodiment of the invention and, together with the description serve to explain the principles of the invention, and wherein.

DETAILED DESCRIPTION OF THE EMBODIMENT

Figure 1:
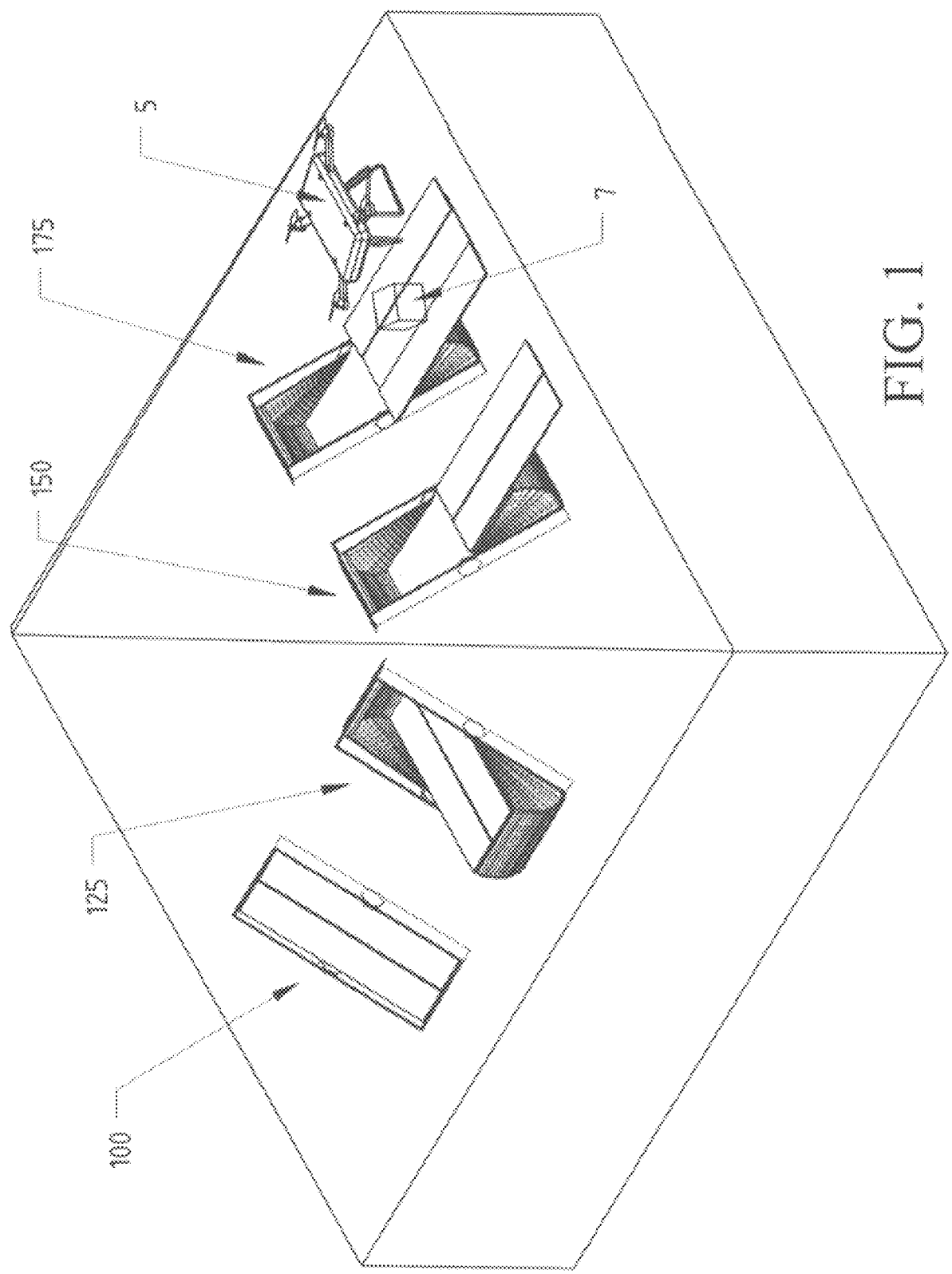
FIG. 1 illustrates a roof of a residential structure displaying a sequence of four different platform positions prior to the package being delivered. The platform fully contracted and rotated to the closed position 100, the platform fully contracted and rotated to the horizontal position 125, the platform rotated to the horizontal position with the main panel extended and side panels retracted 150, the platform rotated to the horizontal position with the platform fully expanded and a deposited package 175.

The description set forth above and below along with the illustrations represent the necessary information to enable those skilled in the art to practice the preferred mode of the embodiment and may recognize concepts and applications not specifically addressed herein. It should be understood that these concepts and applications fall within the scope of the disclosure and accompanying claims. In the specification the terms "longitudinal" and "transverse" shall be understood to have a meaning similar to "lengthwise" and "widthwise" respectfully. The terms "extend" or "extending" may be used to describe a step or steps in the process of "expanding" and the terms "retract" or "retracting" may be used to describe a step or steps in the process of "contracting".

In one embodiment, fixedly mounting a frame to a roof member may include a curb type frame typically required for roof pitches less than 14 degrees where the frame members are slightly raised above the roof sheathing and based on the specific conditions can be constructed on site during the installation or be prefabricated. For relatively flat roofs a minimum slope of three degrees is recommended to allow for more efficient drainage. The frame members can be made from various materials including but not limited to, wood, stainless steel, aluminum, carbon fiber, and the like. A weatherproofing system using flashing will be required by local construction codes to connect the embodiment with its surrounding roof material. It is recommended that the frame be tied directly into the roof rafter members due to the stresses placed on it by the rotation of the platform. FIG. 9B illustrates and example electromechanical rotational means incorporating a servo motor or stepper motor 80. An electromechanical means to longitudinally extend may be practiced by using a linear actuator 70 and slidably mounted may include use of a plurality of mini rails 55,60. It is understood that a person skilled in the art may appreciate the application of these commercially available electromechanical mechanisms in manufacturing the embodiment.

The numbers applied within the illustrations to each element of the embodiment as it appears in different perspectives is consistent throughout all the figures and discloses herein a rooftop package delivery receptacle for unmanned aerial vehicles (UAV) comprising a rectangular frame 15; fixedly mounted to the existing roof members 10; a pair of hinge joints 30 fixedly mounted about the center of both the left and right longitudinal frame members 15; a substantially transparent or translucent platform 25 disposed within the frame member 15 pivotally mounted on either longitudinal side about its center axis to both hinge joint members 30; electro-mechanical rotational means 80 enabling the platform 25 to rotate between a downwardly pitched normally closed position 100, substantially horizontal delivery position 125, 225, and upwardly slanted collecting position 250; a substantially transparent or translucent main panel 40 slidably mounted and parallelly disposed upon the platform 25; electro-mechanical means to longitudinally extend 150, 200 and retract the main panel 40; a plurality of substantially transparent or translucent side panels 50 slidably mounted 55 and parallelly disposed upon the main panel 40; electro-mechanical means to transversely extend 175 and retract the side panels 50.

The sliding means for the main panel 40 may include a plurality of mini rails 55 disposed longitudinally along either side of the platform 25. The sliding means for the side panels 50 may include a plurality of mini rails 60 disposed widthwise along the main panel 40. An upper accordion shaped gusset or shudder portion 35 is removably attached between the upper frame member and upper platform member. A lower accordion shaped gusset or shudder portion 35 removably attached between the lower frame member and lower platform member. One aspect of the embodiment may include an electro-mechanical disconnecting/reconnecting means adapted using a solenoid 20 attached to the platform 25 to allow the collection process to proceed autonomously.

Figure 2:
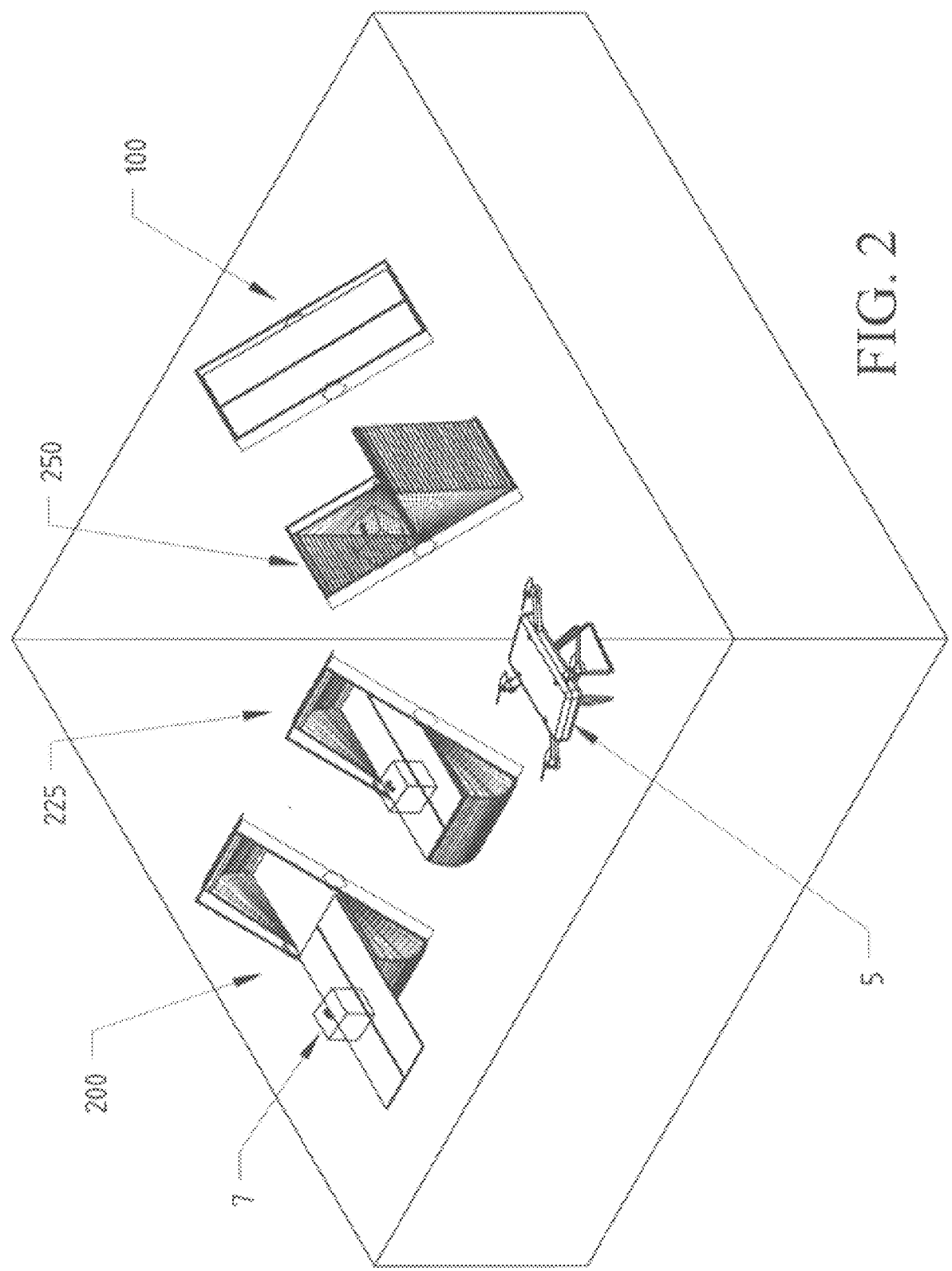
FIG. 2 illustrates a roof of a residential structure displaying a sequence of four different platform positions after the drone has delivered the package. The platform rotated to the horizontal position with main panel extended (both side panels retracted) and a deposited package 200, the platform fully contracted and rotated to the horizontal position and a deposited package 225, the platform fully contracted and rotated to an inward delivery position with a deposited package 250, and the platform fully contracted and rotated back to the closed position 100.
Figure 3A:
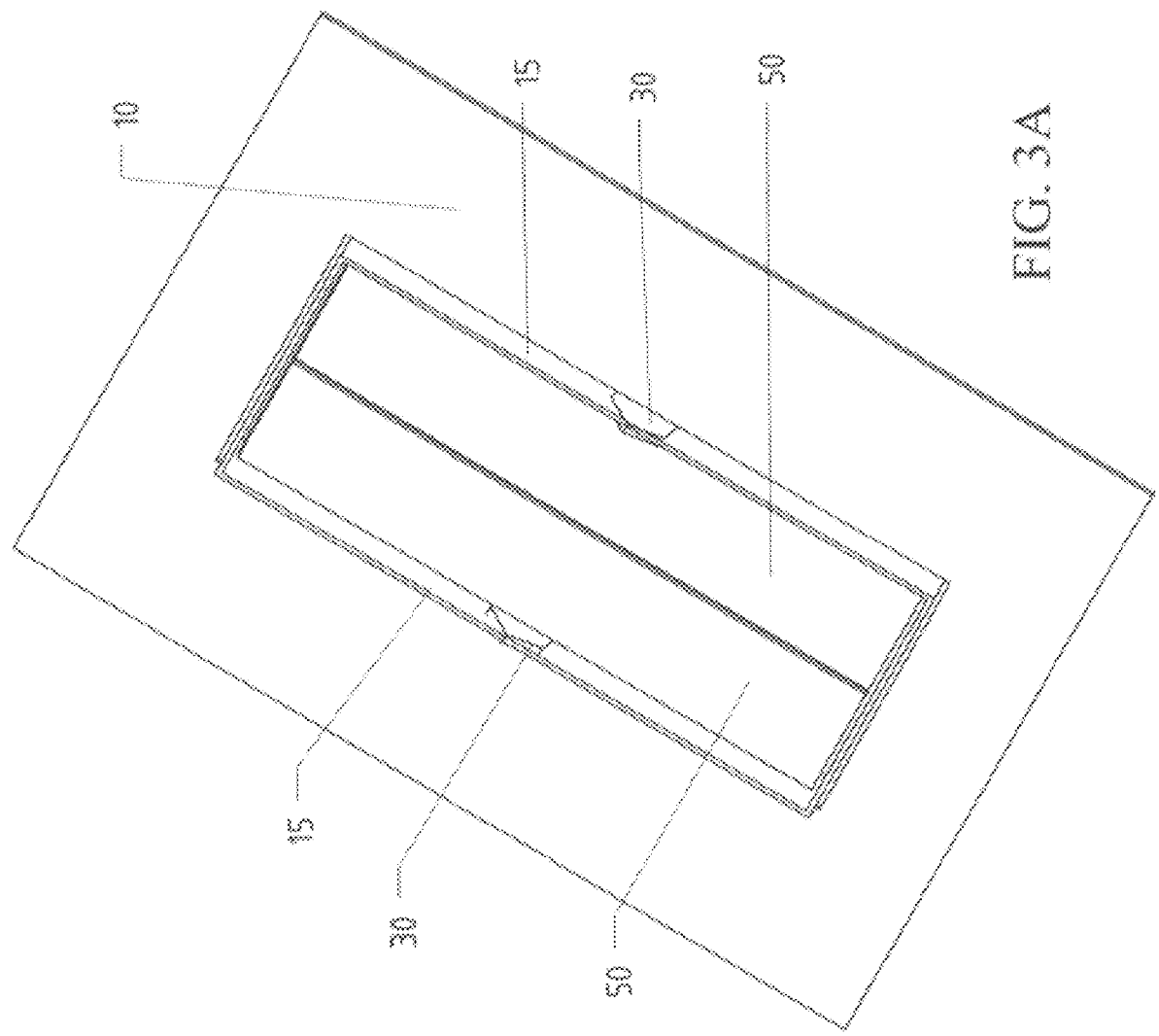
FIG. 3A illustrates a top view of a rooftop with the platform fully contracted and rotated to the closed position.
Figure 3B:
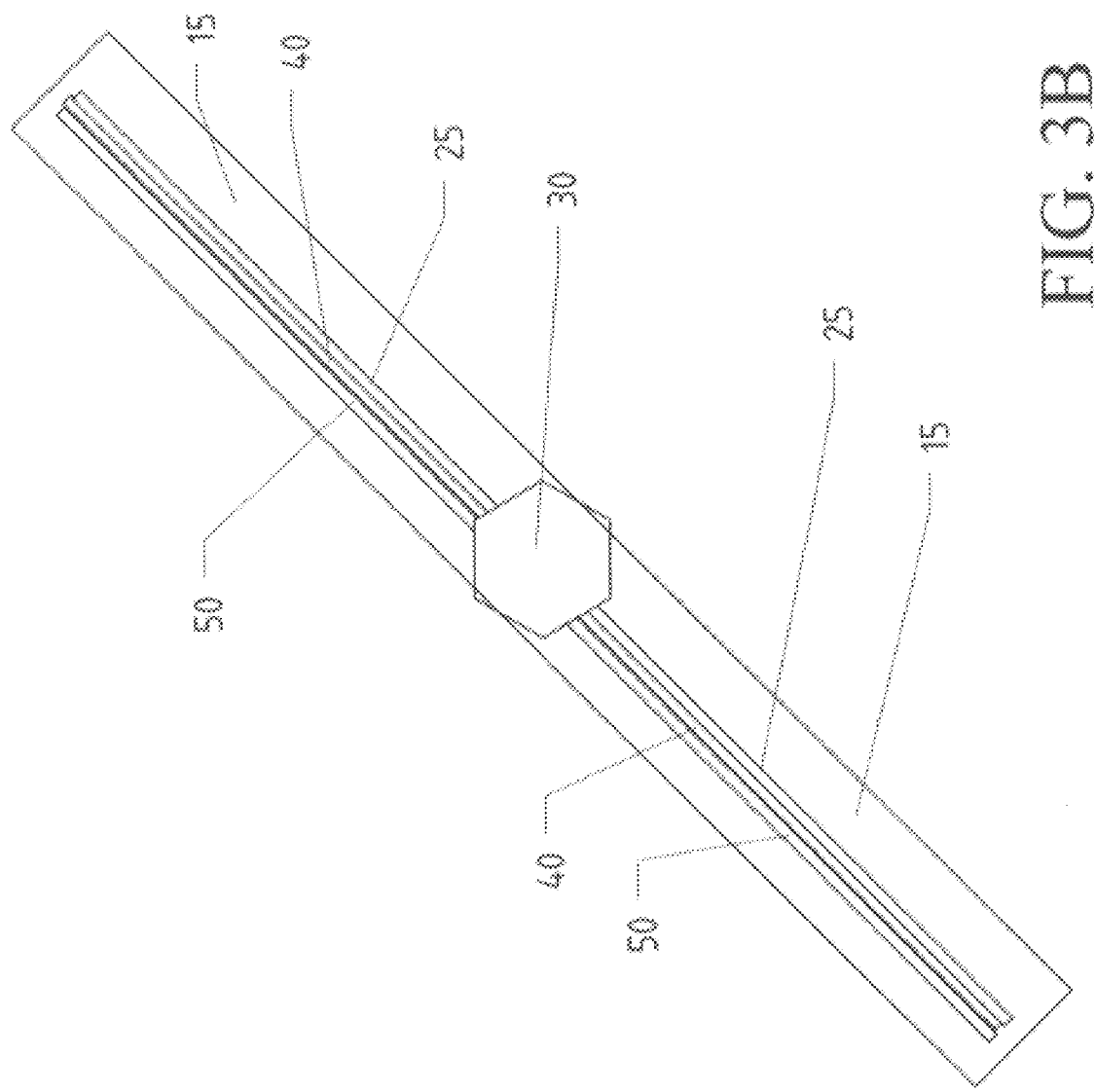
FIG. 3B illustrates a side view of a rooftop with the platform fully contracted and rotated to the closed position.
Figure 4A:
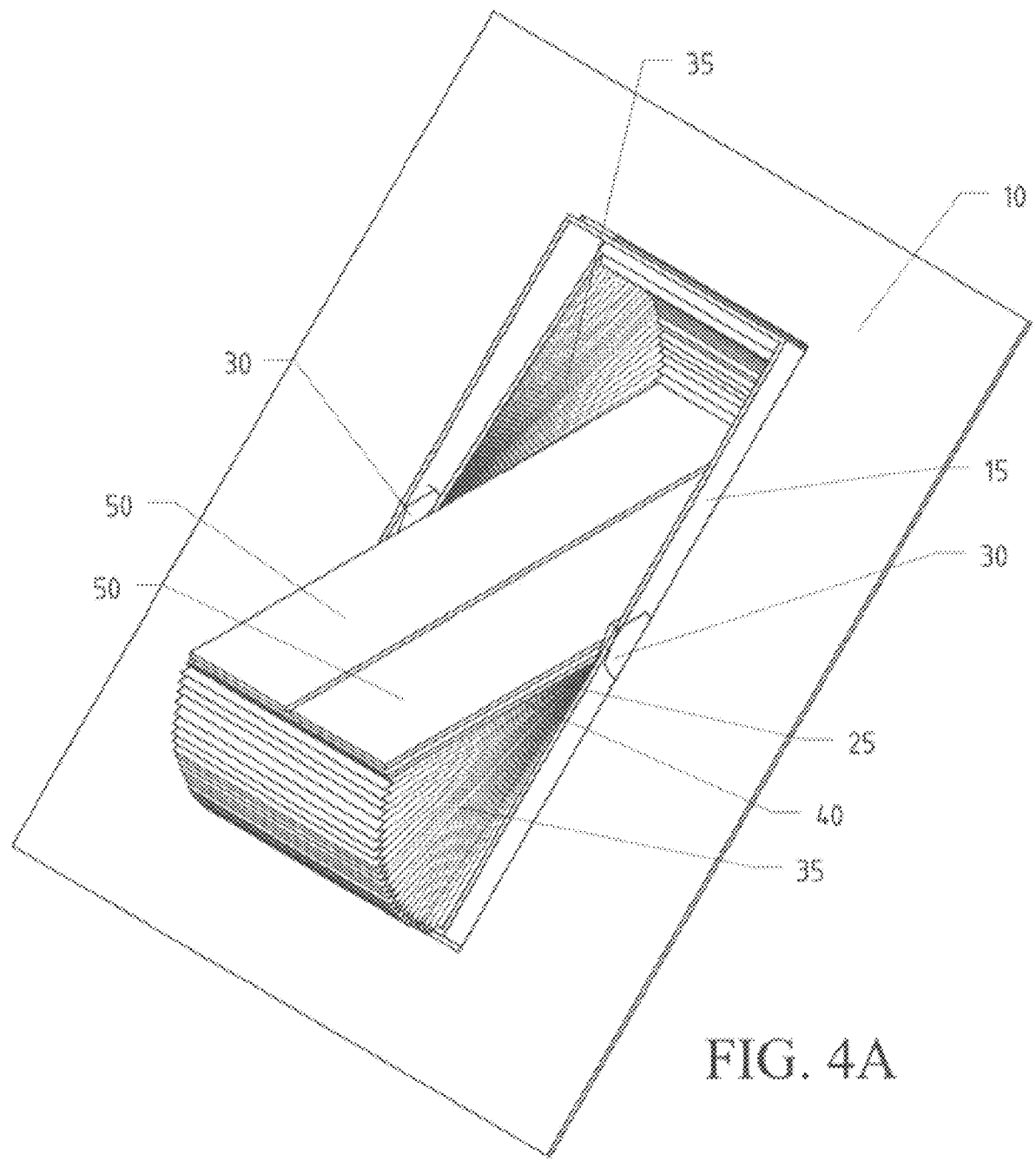
FIG. 4A illustrates a top view of a rooftop with the platform fully contracted and rotated to the horizontal position.
Figure 4B:
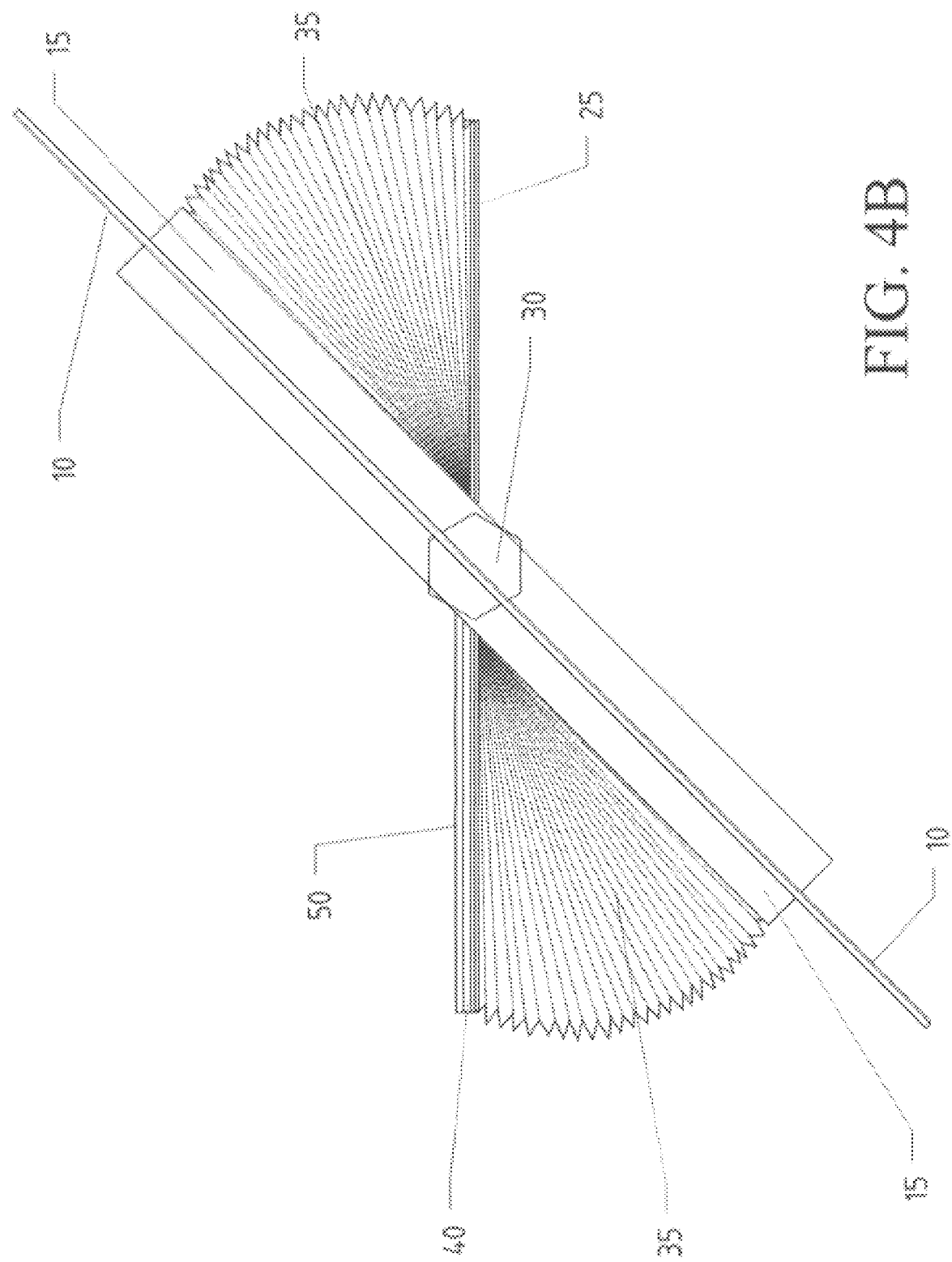
FIG. 4B illustrates a side view of a rooftop with the platform fully contracted and rotated to the horizontal position.
Figure 5A:
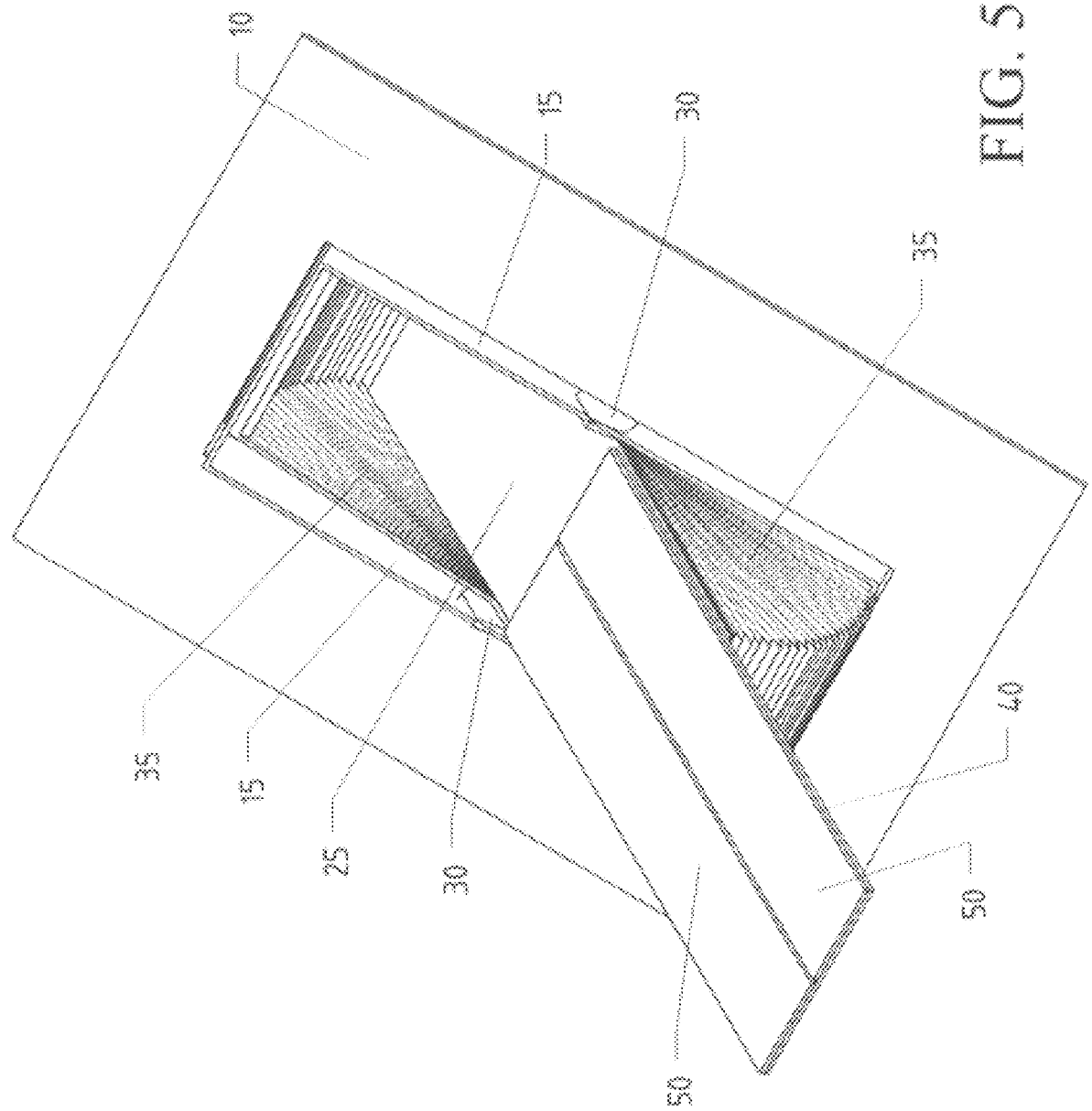
FIG. 5A illustrates a top view of a rooftop with the platform rotated to the horizontal position and in the process of expanding showing the main panel extended and side panels retracted.
Figure 5B:
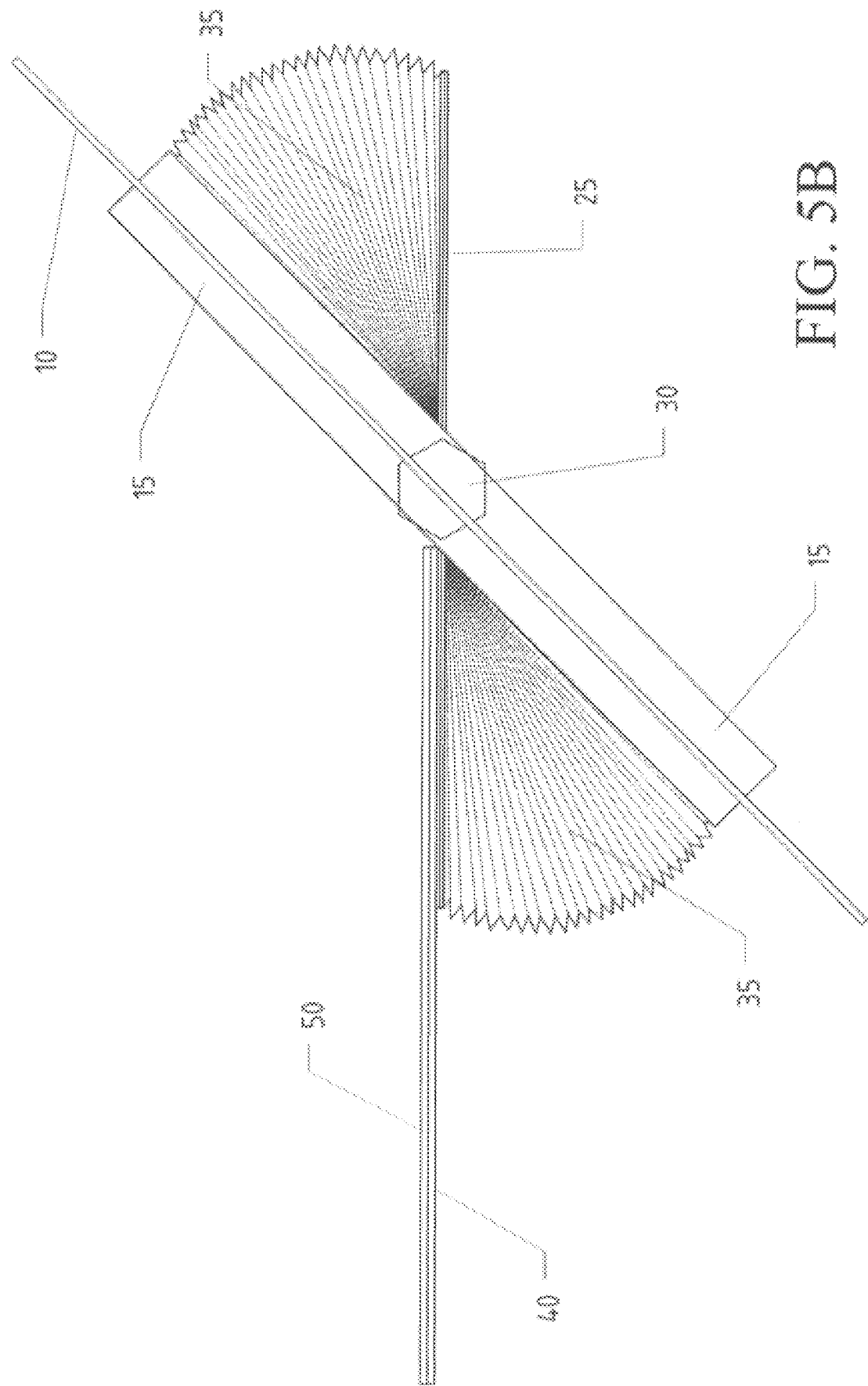
FIG. 5B illustrates a side view of a rooftop with the platform rotated to the horizontal position and in the process of expanding showing the main panel extended and side panels retracted.
Figure 6A:
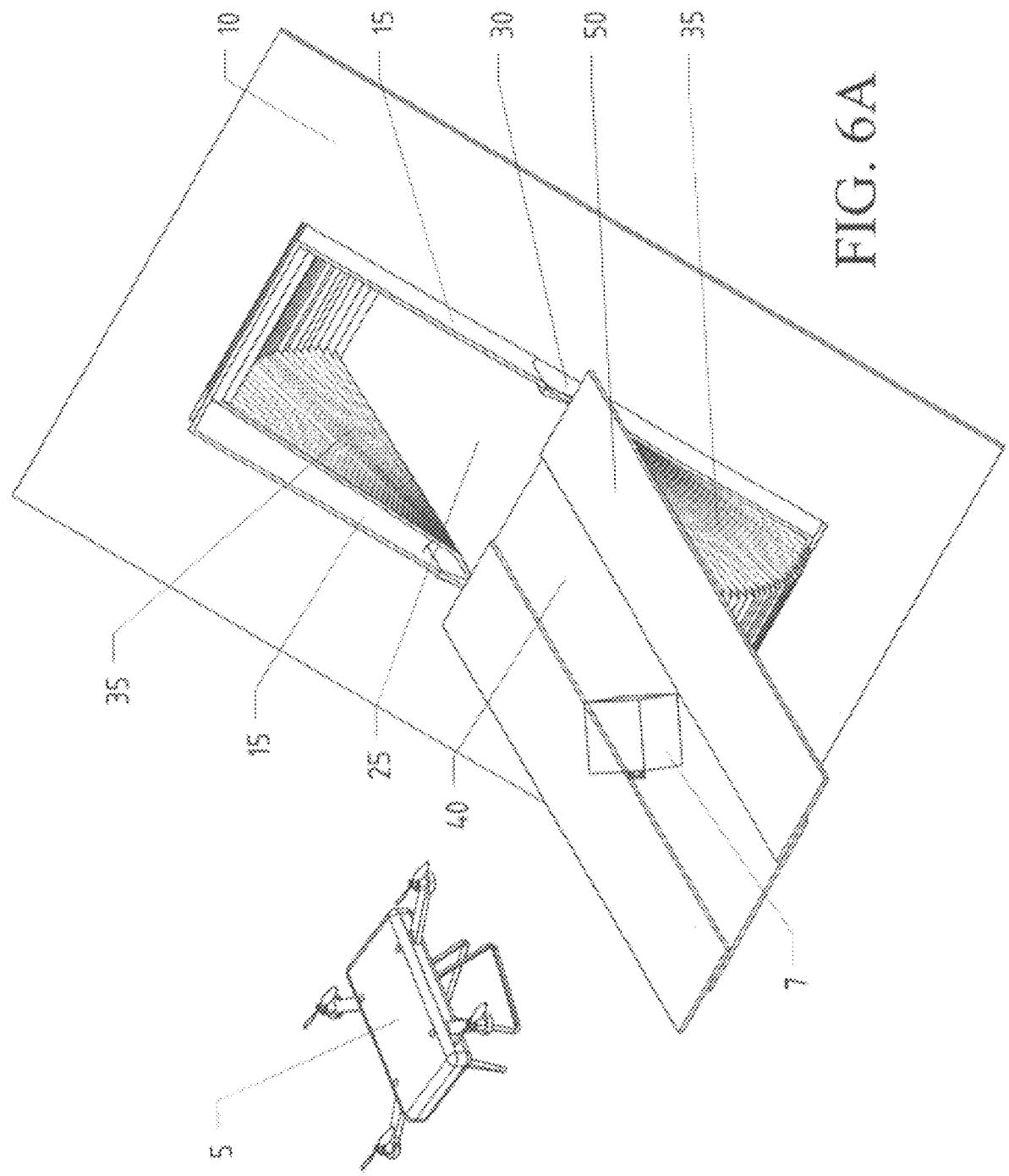
FIG. 6A illustrates a top view of a rooftop with the platform fully expanded and rotated to the horizontal position, a package is located on the surface, and a drone is flying nearby.
Figure 6B:
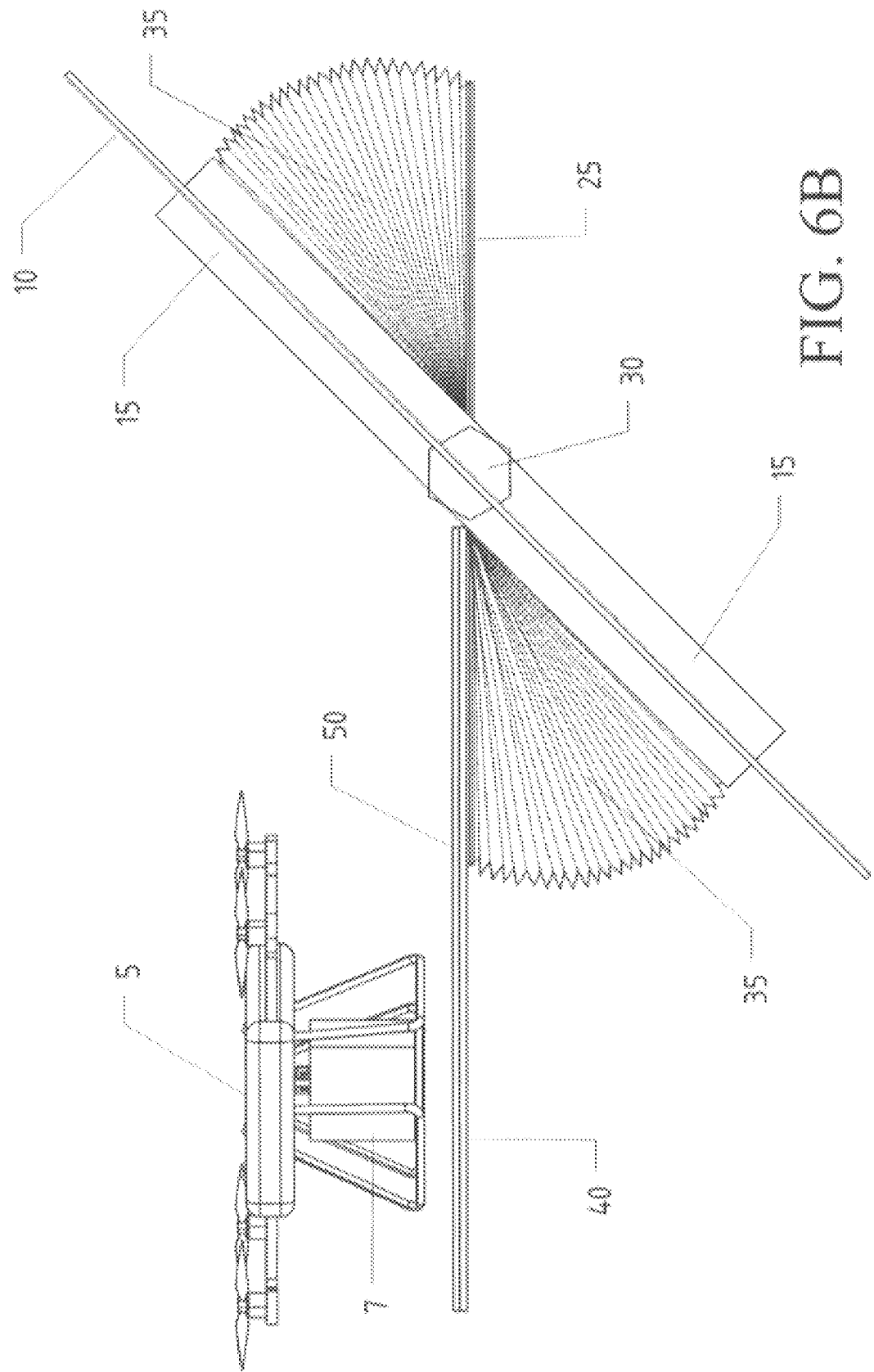
FIG. 6B illustrates a side view of a rooftop with the platform fully expanded, rotated to the horizontal position, and a drone containing a package is in the process of landing.
Figure 7A:
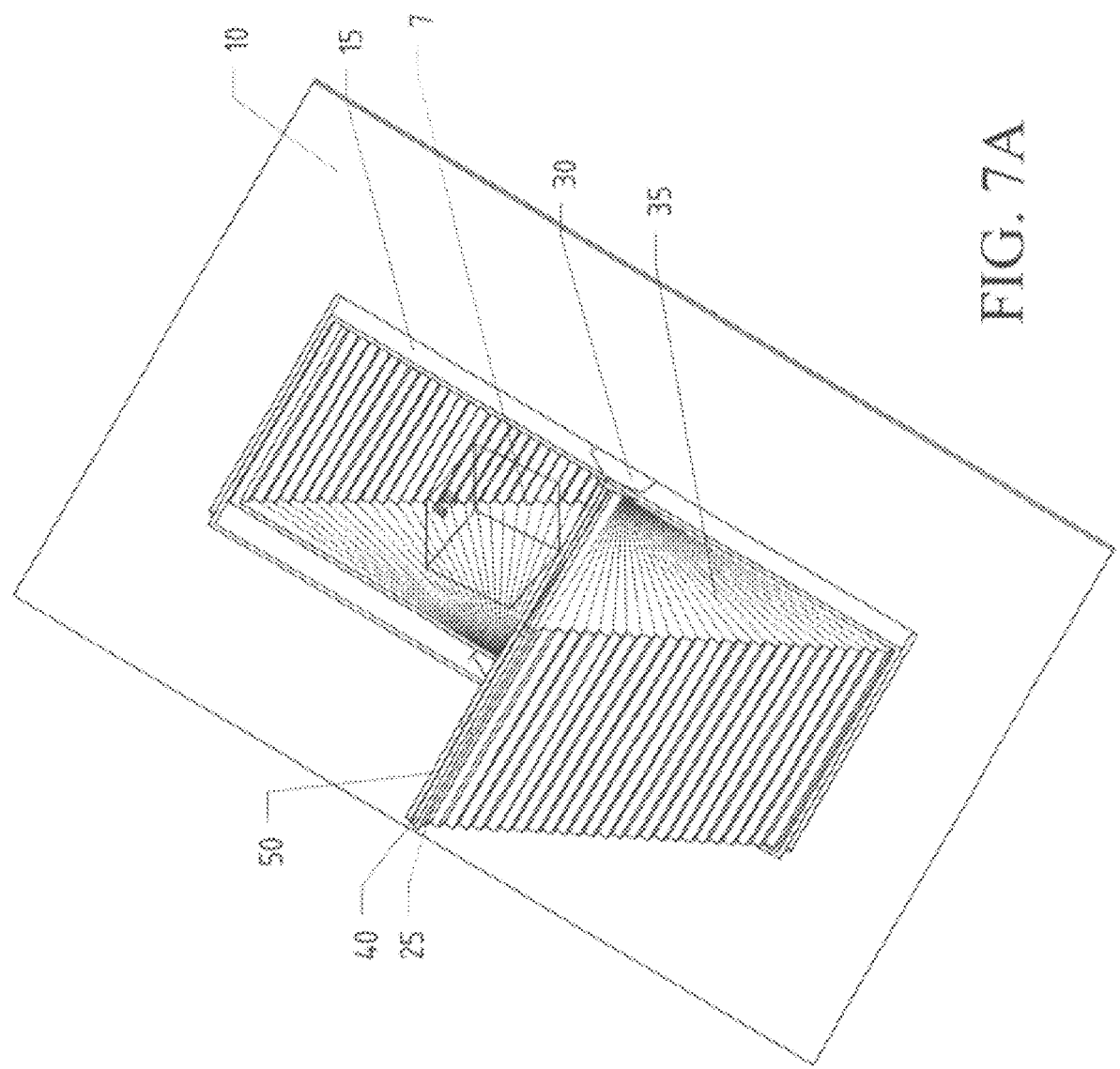
FIG. 7A illustrates a top view of a rooftop with the platform fully contracted and rotated to its inward delivery position with a deposited package.
Figure 7B:
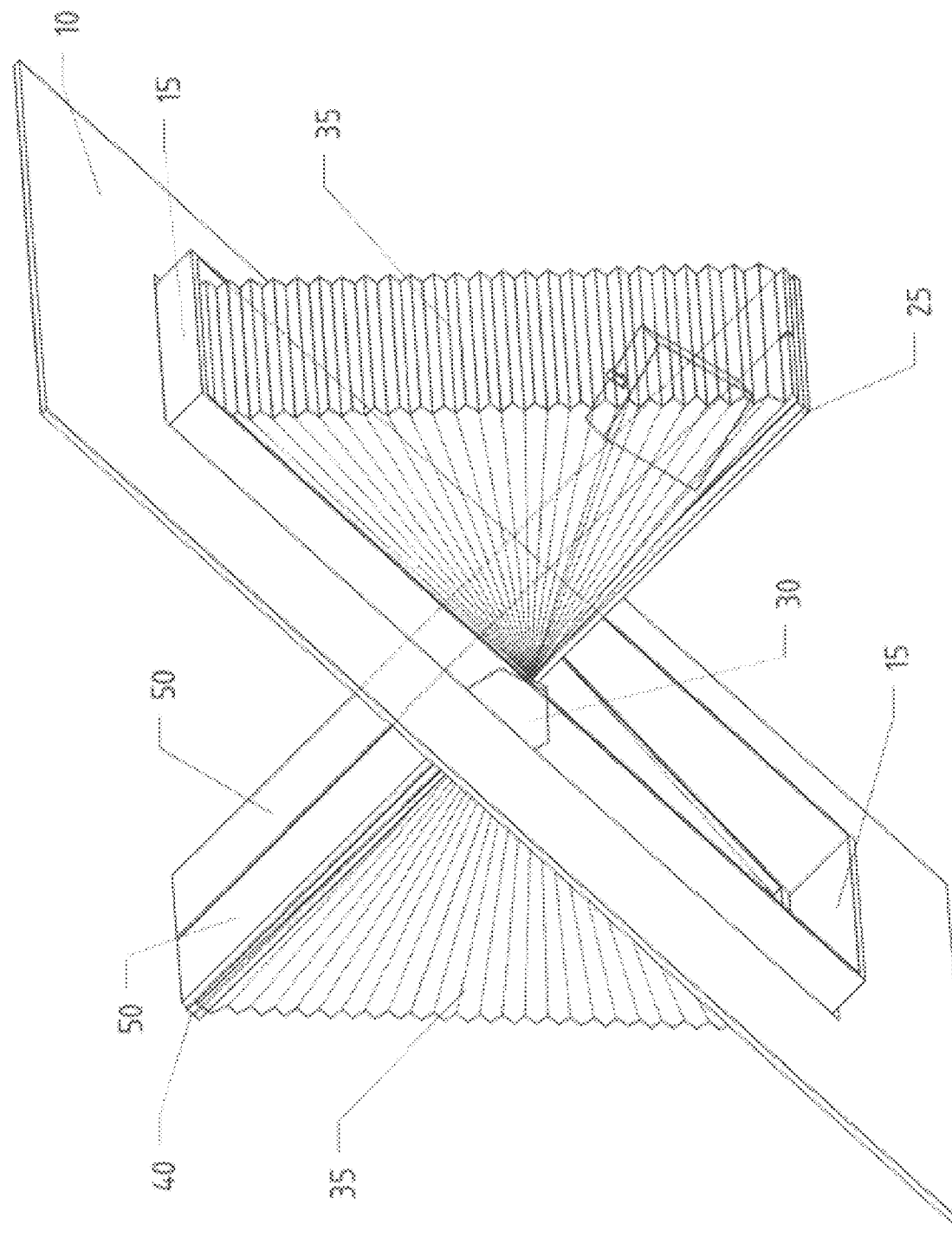
FIG. 7B illustrates an inside view of a rooftop with the platform fully contracted and rotated to its inward delivery position with a deposited package.
Figure 8:
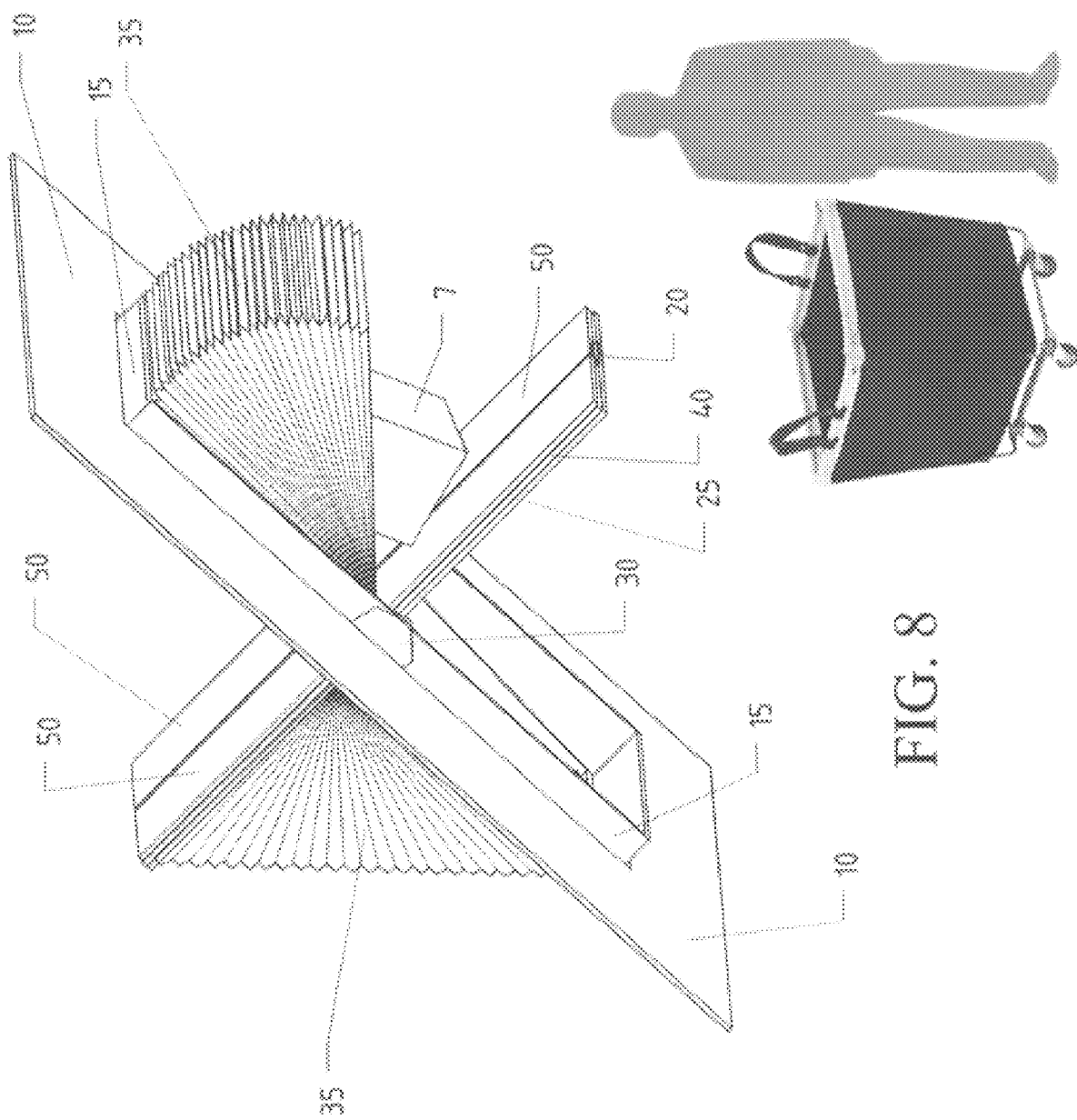
FIG. 8 illustrates an inside view of a rooftop with the platform fully contracted and rotated to its inward delivery position with the upper accordion shaped shutter lifted for collection of the package. Below the platform is shown an example collection basket.

FIGS. 1, 2 illustrate a high-level sequence of how the receptacle is deployed beginning with the receptacle in its normally closed configuration 100. Upon a command signal provided by any one of a number of previously discussed possible sources such as a local remote control 85, Wi-Fi device 95 or by a drone delivery service subscription through an internet connection 97 alerting its customer that a package is on its way, the receptacle initiates a series of movements transforming itself into a suitable landing area for the UAV 5 to deliver a package 7 wherein, the platform 25 starting in its normally closed position; as shown in FIGS. 3A, 3B, rotates to a horizontal position; as shown in FIGS. 4A, 4B. A main panel extends outwards along the platforms longitudinal direction as shown in FIGS. 5A, 5B, followed by both side panels extending outwards along the platforms widthwise direction as shown in FIGS. 6A,6B waiting for a UAV 5 to deposit a package 7. Subsequently, with the package already on the platform, and after receiving a local signal by the customer from a remote hand held device 85 or from the delivery UAV over the internet 97 via Wi-Fi 95, a reverse sequence commences including the contraction of both side panels 50, main panel 40, and upwards rotation of the platform 25 urging the delivered package 7 to be moved into the interior of the receptacle as shown in FIGS. 7A, 7B to either be collected manually by a person or slide off the inside edge of the platform 25 into a collection basket as shown in FIG. 8. The collection process can proceed autonomously utilizing a solenoid 20 as an electromechanical disconnecting reconnecting means for the shudder attachment.

Figure 9A:
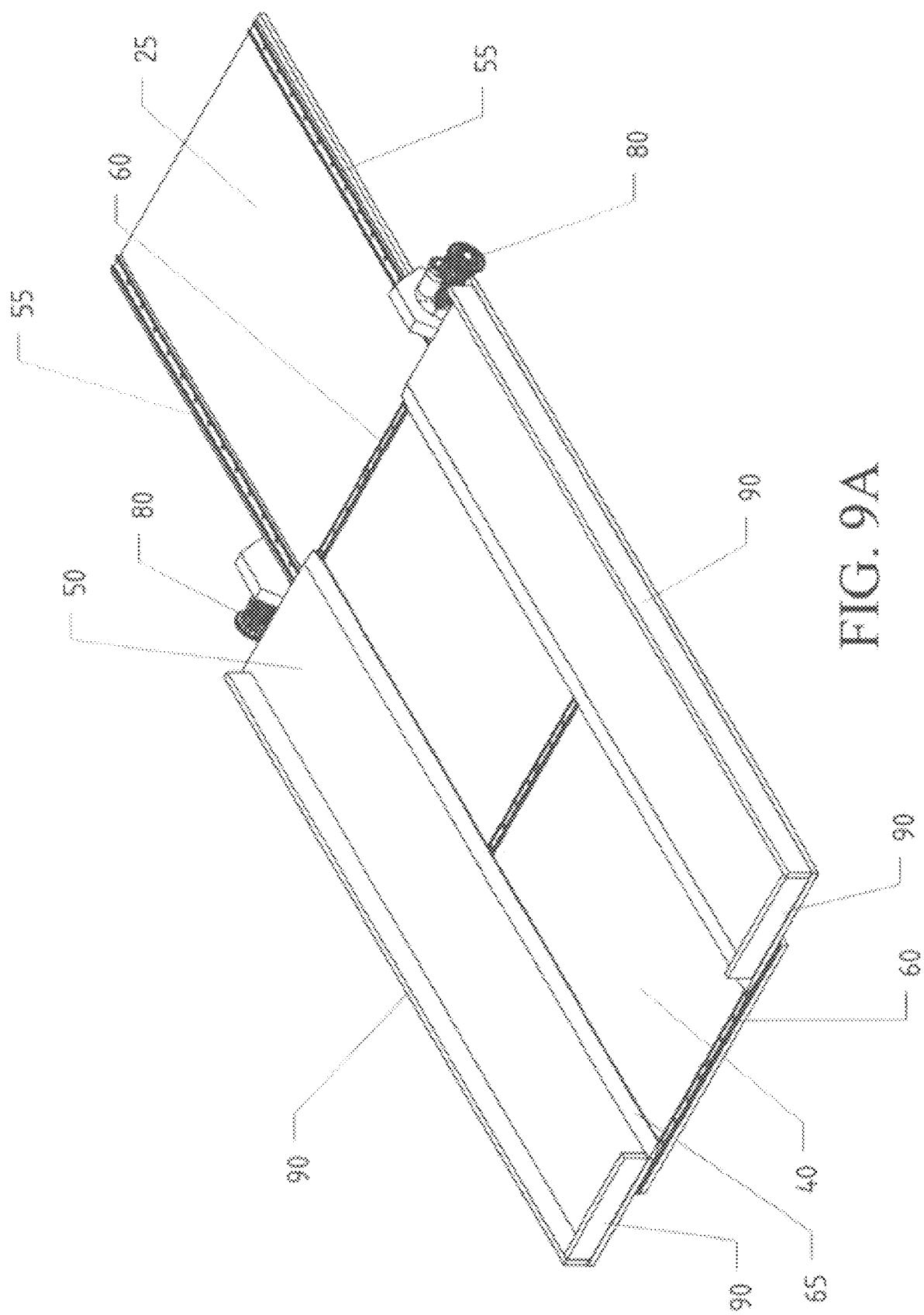
FIG. 9A illustrates a top view of the platform fully expanded showing example aspects of the embodiment including the sliding means, beveled edges, raised edges, and electromechanical rotation means.
Figure 9B:
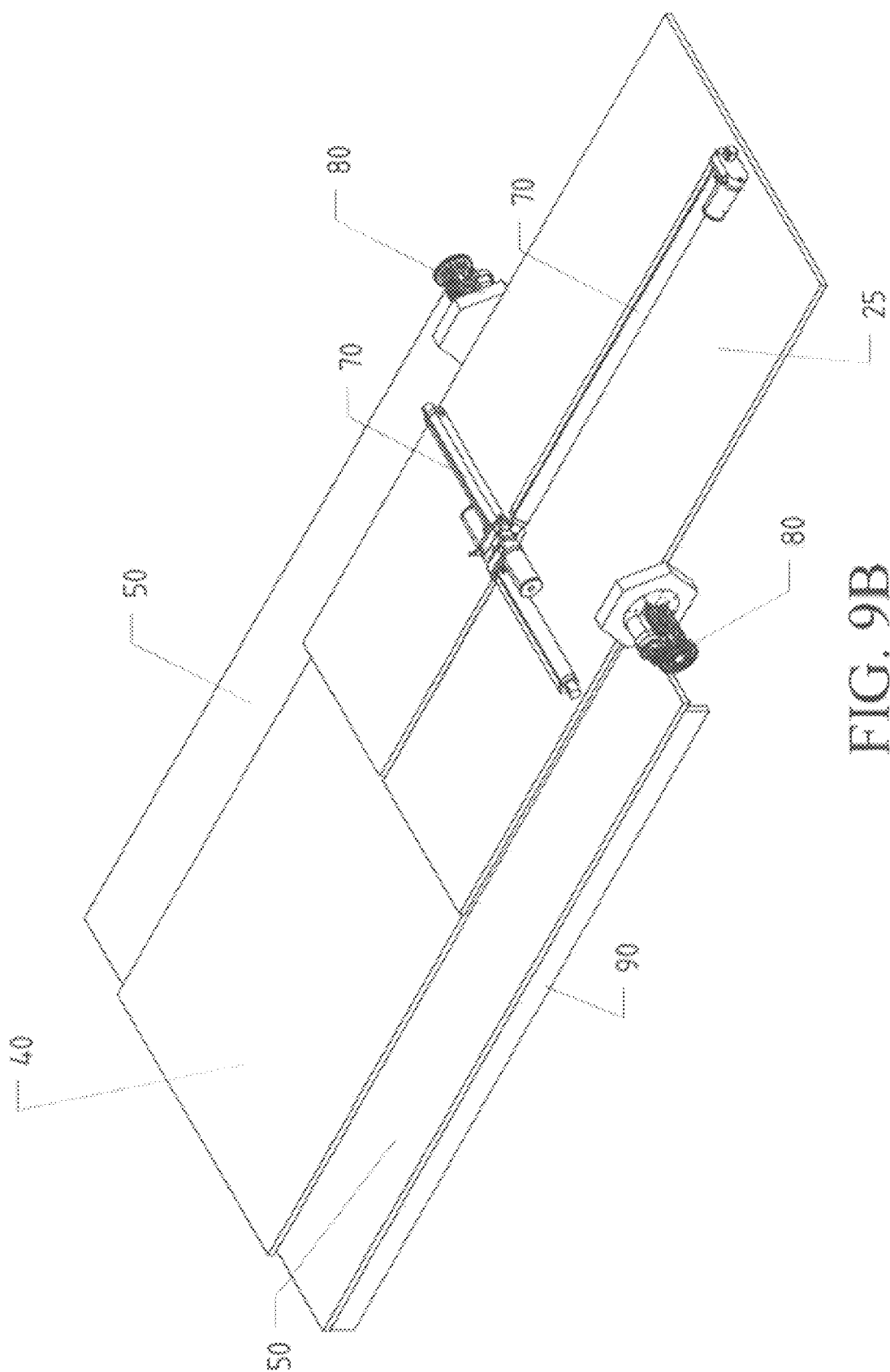
FIG. 9B illustrates a bottom view of the platform fully expanded showing example aspects of the embodiment including the electromechanical rotation means and electromechanical sliding means.
Figure 10:
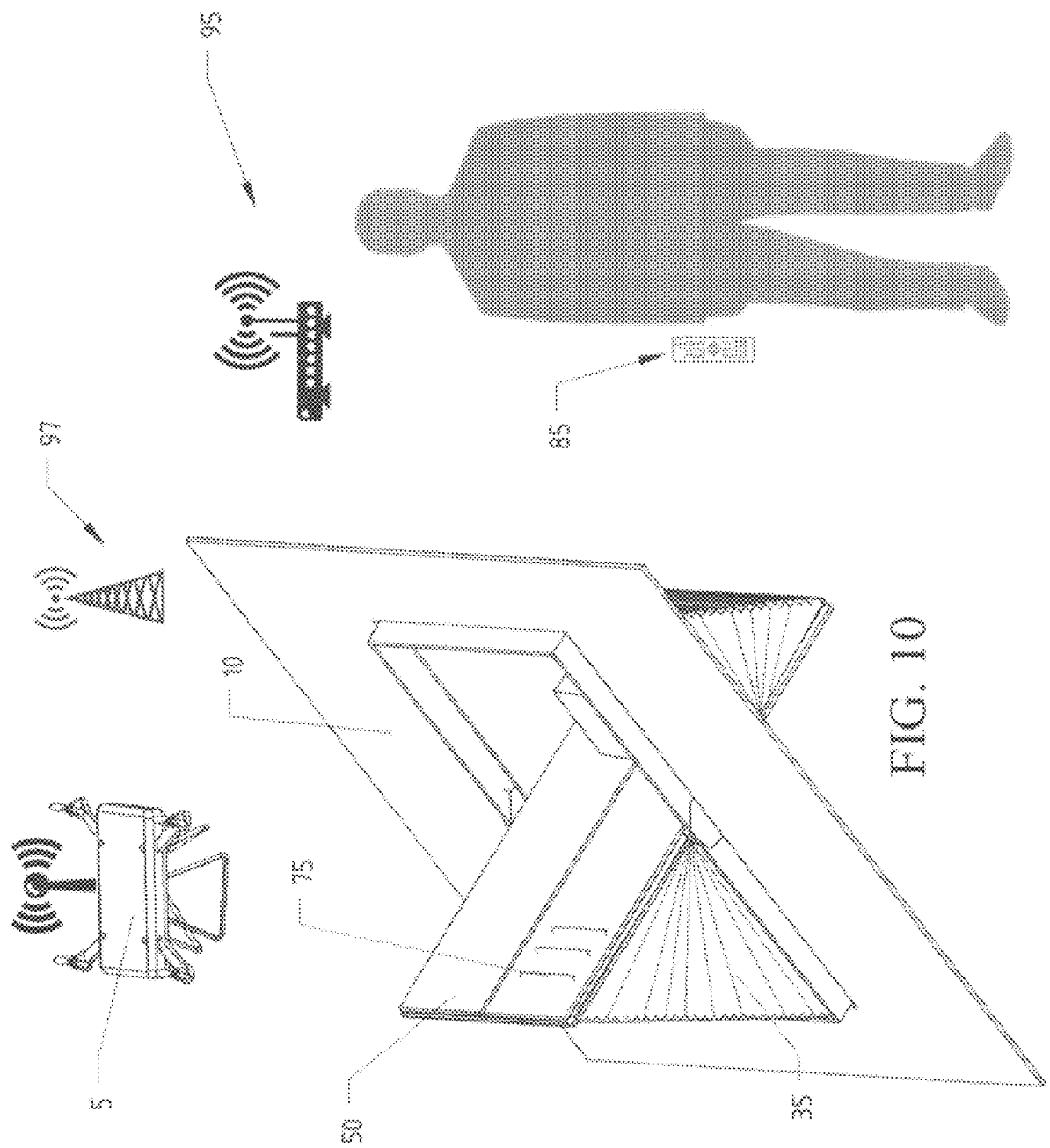
FIG. 10 illustrates a view of a rooftop with the platform fully contracted and rotated to its inward delivery position with a deposited package showing additional aspects of the embodiment including one of the panels having micro rollers, a Wi-Fi router—RF linkage, and a hand-held remote-control device.

Other aspects of the embodiment shown in FIGS. 9A, 9B, 10 may include a tapered edge 65 disposed along the inside longitudinal edge of each side panel to minimize any friction caused by the package 7 when the platform 25 is contracted back to its original size. Another aspect of the embodiment may include a raised ledge 90 disposed along the outside longitudinal edge of each side panel for stability. Another aspect of the embodiment may include a plurality of unidirectional miniature rollers 75 transversely mounted within the surface of the topmost panels thereby reducing friction while enabling the package to only move inwards towards the aperture for collection.

It is important to remember that the main objective and intent of this invention is to provide a safe, secure, appropriately sized, and aesthetically acceptable rooftop package delivery receptacle for unmanned aerial vehicles by providing a replacement to an existing rooftop aperture such as a skylight whose normal downwardly slanted appearance and measurably smaller surface area is transformed by way of rotation, and expansion while still remaining closed to the outside elements to a substantially horizontal platform suitable for a drone to land or tether a package. It is understood that while the preceding discussion given by way of illustration and narrative depict one possible embodiment it remains apparent to persons skilled in the art that there may exist certain modifications and variations which would still fall within the broader scope of the invention as set forth.

The invention claimed is:

1. A rooftop package delivery receptacle for unmanned aerial vehicles comprising:
   a. a fixed curb frame comprising longitudinal frame members and transverse frame members defining a roof aperture;
   b. a pair of hinge joints mounted directly upon the longitudinal frame members of the frame, the hinge joints being adapted to pivotably receive portions of an expandable contractible platform therewithin;
   c. electromechanical rotational means configured for enabling the platform to rotate between a normally closed position substantially parallel to the frame, midway to a substantially horizontal position for package delivery, and upward to an inwardly slanted position for package collection and to any position therebetween;
   d. the expandable contractible platform further comprising a plurality of coplanar slidably mounted panels;
   e. sliding means configured for enabling the panels to longitudinally and transversely expand outwards and contract inwards;
   f. electromechanical expansion and contraction means configured for expanding the platform outwards for package delivery and contracting the platform inwards for package collection and platform closure; and
   g. an upper and lower accordion shaped shutter portion removably attached between the frame and the platform adapted to enclose gaps therebetween.

2. A rooftop package delivery receptacle as defined in claim 1 wherein the electromechanical rotational means farther comprising of a plurality of servo or stepper motors.

3. A rooftop package delivery receptacle as defined in claim 1 wherein the sliding means further comprising a plurality of mini rails substantially disposed longitudinally along the platform upper side and transversely along the panels upper side.

4. A rooftop package delivery receptacle as defined in claim 1 wherein the electromechanical expansion and contraction means further comprising a plurality of linear actuators disposed on the underside of the platform.

5. A rooftop package delivery receptacle as defined in claim 1 wherein the platform, and the panels are substantially transparent.

6. A rooftop package delivery receptacle as defined in claim 1 wherein the panels are further sub divided into a plurality of smaller opaque or translucent sections disposed within a rigid structural grid; grid members of said grid being disposed both longitudinally and transversely for concealment.

7. A rooftop package delivery receptacle as defined in claim 1 wherein portions of the platform, portions of the panels, and portions of the frame further comprising rubber gaskets disposed along each edge of said portions creating a waterproof seal upon platform closure.

8. A rooftop package delivery receptacle as defined in claim 1 wherein the panels inside edge portion further comprising a sloping surface, tapered edge, or bevel urging a delivered package to slide onto the panels during the platform contraction process.

9. A rooftop package delivery receptacle as defined in claim 1 wherein the panels upper side further comprising a conveyor comprising a plurality of transversely disposed pivotally mounted miniature unidirectional mechanical rollers adapted urging the package to slide in only one direction for collection.

10. A rooftop package delivery receptacle as defined in claim 1 wherein the panels outside edge further comprising a raised surface or sidewall for stability.

11. A rooftop package delivery receptacle as defined in claim 1 wherein the upper accordion shaped shutter portion further comprising an electromechanical means to disconnect and reconnect, said means being a solenoid.

12. A rooftop package delivery receptacle as defined in claim 1 wherein each accordion shaped shutter portion further comprising an elastic material urging the collapse of said accordion shaped shutter portion into the frame.

13. A rooftop package delivery receptacle as defined in claim 12 wherein each accordion shaped shutter portion further comprising a substantially weather resistant material.

14. A rooftop package delivery receptacle as defined in claim 1, further comprising a control system to coordinate the electromechanical rotational means and the electromechanical expansion and contraction means for package delivery and collection.

15. A rooftop package delivery receptacle as defined in claim 1 wherein the hinge joints further include a locking means enabling the platform to remain stationary at the closed position, horizontal, position for package delivery, and inwardly slanted position for package collection; said locking means comprising a plurality of pins disposed within the hinge joints adapted to engage the frame via a solenoid.

16. In a rooftop package delivery receptacle for unmanned aerial vehicles suitable for installation within a fixed curb frame comprising longitudinal frame members and transverse frame members defining a roof aperture, the combination of
   a. a pair of hinge joints mounted directly upon the longitudinal frame members of the frame, the hinge joints being adapted to pivotably receive portions of an expandable contractible platform therewithin;
   b. electromechanical rotational means configured for enabling the platform to rotate between a normally closed position substantially parallel to the frame, midway to a substantially horizontal position for package delivery, and upward to an inwardly slanted position for package collection and to any position therebetween;
   c. the expandable contractible platform including a plurality of coplanar slidably mounted panels;
   d. sliding means configured for enabling the panels to longitudinally and transversely expand outwards and contract inwards;
   e. electromechanical expansion and contraction means configured for expanding the platform outwards for package delivery and contracting the platform inwards the package collection and platform closure; and
   f. an upper and lower accordion shaped shutter portion removably attached between the frame and the platform adapted to enclose gaps therebetween.

17. A rooftop package delivery receptacle as defined in claim 16 wherein the joints further include a locking means enabling the platform to remain stationary at the closed position, horizontal position for package delivery, and inwardly slanted position for package collection; said locking means comprising of plurality of pins disposed within the hinge joints adapted to engage the frame via a solenoid.

* * * * *